United States Patent [19]
Effenberger

[11] 3,787,281
[45] Jan. 22, 1974

[54] FORMING A HYDROLYTICALLY STABLE BOND BETWEEN GLASS AND POLYTETRAFLUOROETHYLENE

[75] Inventor: John A. Effenberger, Wilmington, Del.

[73] Assignee: E. I. du Pont de Nemours and Company, Wilmington, Del.

[22] Filed: Oct. 29, 1968

[21] Appl. No.: 771,574

[52] U.S. Cl............. 161/188, 117/54, 117/126 GN, 156/329, 156/331, 156/333, 161/189, 161/193, 161/204
[51] Int. Cl......................... B32b 17/04, B32b 27/28
[58] Field of Search... 161/188, 193, 189, 204, 192, 161/206; 156/326, 329, 331, 333; 117/54, 126 GS, 126 GR, 126 GQ, 126 GN, 126 GS

[56] References Cited
UNITED STATES PATENTS

| | | | |
|---|---|---|---|
| 2,833,686 | 5/1958 | Sandt | 161/189 X |
| 3,287,204 | 11/1966 | Marzocchi | 117/126 X |
| 3,306,800 | 2/1967 | Plueddemann | 161/193 X |
| 3,318,757 | 5/1967 | Atwell | 161/193 |
| 3,391,052 | 7/1968 | Marzocchi | 117/126 X |
| 3,398,044 | 8/1968 | Plueddemann | 117/126 X |
| 3,558,345 | 1/1971 | Baum et al. | 117/54 |

Primary Examiner—Harold Ansher
Attorney, Agent, or Firm—Edwin Tocker

[57] ABSTRACT

Polytetrafluoroethylene is contacted with glass fiber coated with either an amino-functional, water-hydrolyzable organo silane or methacrylato chromic chloride and sintered under an inert atmosphere to obtain bonding between the glass and the polytetrafluoroethylene.

18 Claims, 1 Drawing Figure

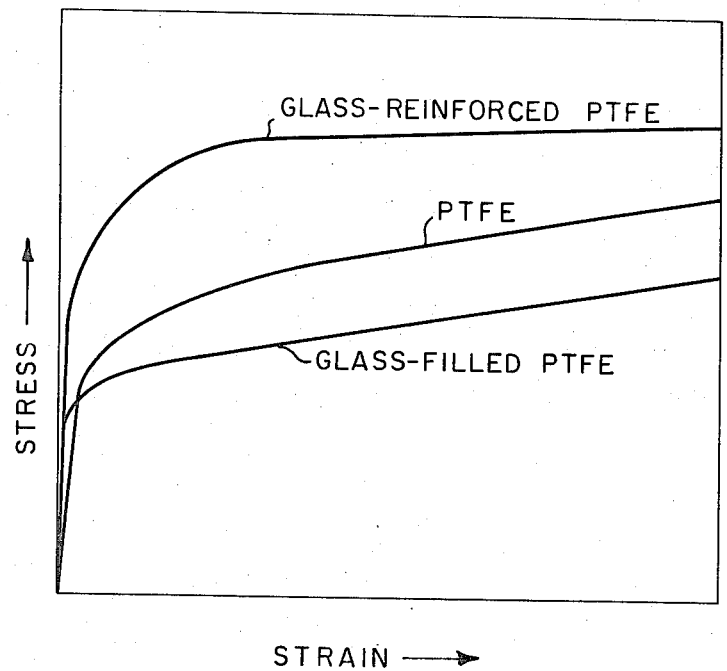

FORMING A HYDROLYTICALLY STABLE BOND BETWEEN GLASS AND POLYTETRAFLUOROETHYLENE

This invention relates to a process for bonding glass to polytetrafluoroethylene and to the resultant composite product.

The bonding of glass to thermoplastic resins, of which polytetrafluoroethylene is stated to be one, through a coupling agent is disclosed in U.S. Pat. No. 3,306,800 to Plueddemann, wherein the coupling agent is a polymeric material having a molecular weight of at least 2,000. The coupling agent is made by forming a copolymer of an organo silane with a polymer which is compatible with the thermoplastic resin. The use of monomeric organo silanes as coupling agents is also known, but such use has been limited to bonding glass to hydrocarbon polymers (e.g., U.S. Pat. No. 3,013,915 to Morgan), except for U.S. Pat. No. 3,380,406 to Gosnell, which discloses bonding glass to tetrafluoroethylene/hexafluoropropylene copolymer. Another type of coupling agent, i.e., methacrylato chromic chloride, has been disclosed in U.S. Pat. No. 2,910,378 to Hauserman, as a coupling agent for bonding polyesters, phenolics, polyamides and polyepoxides to glass.

The present invention provides a method for obtaining a hydrolytically stable bond between polytetrafluoroethylene and glass and the resultant composite product, the method comprising sintering in inert atmosphere the polytetrafluoroethylene in contact with the glass which has previously been coated with either an amino-functional, water-hydrolyzable organo silane or methacrylato chromic chloride.

Any of the available silica-containing glasses can be used in the present invention. Such glasses will usually contain at least 30 percent by weight $SiO_2$ and more often at least 50 percent by weight, and include the soda-lime-silica and borosilicate glasses. The glass will generally be in a particulate form, such as flakes, beads or powder, or funicles, e.g., filaments or fibers, or textile products obtained from filaments and/or fibers, such as fabrics, strands, chopped strands, or mats. The particular form chosen will depend on end-use. For reinforcing the polytetrafluoroethylene, i.e., strengthening the polymer, glass fibers will generally be the form chosen. The preferred glass fibers are those having diameters up to 0.6 mil and a length-to-width ratio of at least 10:1. Typical lengths include lengths of from 1/64 inch to ¼ inch, obtained by chopping. Shorter lengths which are typically obtained by milling can be used.

The polytetrafluoroethylene (abbreviation PTFE) which can be used in the present invention can be the dispersion type (fine powder) or the granular type. The polymer is not fabricable from a melt but instead is formed into a compact mass which is rendered coherent by sintering.

The amino-functional, organo-silane coupling agents used in the present invention are monomeric in nature and are well known in the art, as represented by U.S. Pat. No. 3,013,915 to Morgan; U.S. Pat. Nos. 3,252,825, 3,252,278 and 2,931,739 to Marzocchi et al.; U.S. Pat. No. 3,318,757 to Atwell; U.S. Pat. No. 2,920,095 to Jex et al.; U.S. Pat. No. 3,231,540 to Vanderbilt; and British Patent No. 1,069,752. In general, the organo-silane coupling agent has at least one water-hydrolyzable functional group attached directly to the Si atom of the silane and at least one organic group connected directly to the silicon atom of the silane through a stable carbon-to-silicon bond and containing at least one amino-functional group. The water-hydrolyzable functional group of the silane forms a bonding relationship with the glass and the amino-functional group forms a bonding relationship with the PTFE, thereby coupling the glass to the PTFE, under process conditions to be further described hereinafter.

The amino-functional silanes can be described in greater detail as being represented by the formula

wherein A is the water-hydrolyzable functional group, B is the organic group containing the amino-functional group, and each C can be either A, B, or an alkyl group, preferably containing from one to five carbon atoms. Examples of group A include hydroxyl, halogen such as Cl or F, alkoxy, preferably containing from one to five carbon atoms, aryloxy, e.g., phenoxy or naphthoxy and acetoxy. Examples of group B include aliphatic and aromatic groups, in which the amino function can be primary, secondary, or tertiary, Thus, B includes the group

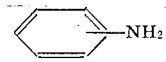

bonded directly to the Si atom or indirectly thereto, such as through an alkylene group, and the group —$(CH_2)_x NH_2$, wherein x is an integer of from 2 to 12, but preferably 3 to 9; —$(CH_2)_y NH(CH_2)_z NHR$, wherein y is an integer of from 2 to 4, and z is an integer of from 1 to 4, and R is H, methyl or ethyl; and —$(CH_2)_x$—$N(CH_3)_2$, wherein x has the same meaning as before. Preferred silanes include the omega-aminoalkyltrialkoxy silanes, such as gamma-aminopropyltriethoxy silane, meta and para aminophenyltriethoxy silane, and N(n-propyl trimethoxysilyl) ethylene diamine.

The methacrylato chromic chloride that can be used as a coupling agent in the present invention is a Werner type of chrome complex, which is further described in U.S. Pat. No. 2,544,666 to Goebel et al., U.S. Pat. No. 2,733,182 to Dalton et al., and U.S. Pat. No. 2,910,378 to Hauserman, and is commercially available under the trademark "Volan", as further described in the last mentioned patent. The chrome complex is generally used in the form of an aqueous solution which may have its pH adjusted to from 4 to 7 using a nitrogen-containing base, but this pH adjustment is not necessary to effect bonding in the present invention.

The first step in this invention is to coat the glass with an amino-functional organo silane, or with an aqueous solution of methacrylato chromic chloride. The organo silane is used in the form of organic or aqueous solution or dispersion of the silane. The coupling agent is applied to the glass, such as by mixing, spraying or dipping to form a coating of the thickness desired, followed by drying. The solution or dispersion of coupling agent will generally contain from 0.25 to 5 percent by weight of coupling agent.

The polytetrafluoroethylene and coupling agent-coated glass are then brought into intimate contact with one another, followed by heating in an inert atmosphere to sinter the polytetrafluoroethylene, which, upon subsequent cooling, yields the composite product of glass bonded to polytetrafluoroethylene through the coupling agent. The manner of contacting the coated glass and polytetrafluoroethylene one with the other will depend on the form of the glass and the polymer. For example, if the coupling agent-coated glass and the polymer are in particulate form, the polymer and glass can be mixed to form a uniform blend containing from 5 to 50 percent by weight of glass, followed by shaping and sintering of the blend. Thus, coupling agent-coated glass fibers can be dispersed in a dispersion of polytetrafluoroethylene, followed by coagulating the polymer dispersion and drying. When the coupling agent-coated glass is in such form as a fabric or mat, the polymer can be applied to it in solid form, such as skived sheet or from a liquid vehicle, followed by drying in the latter case. When polymer in solid form such as skived sheet is used, it may be necessary to apply pressure during sintering to insure intimate contact between polymer and coated glass. Sintering is carried out at a temperature above 370°C., but below the decomposition temperature of the polytetrafluoroethylene; generally, sintering is carried out at a temperature of from 350 to 390°C.

It is critical that the sintering be carried out in an inert atmosphere, otherwise hydrolytically stable bonding of the polytetrafluoroethylene to the coupling agent-coated glass does not occur. By hydrolytically stable bonding is meant that the bond survives boiling in water at 100°C. for at least 24 hours. If the bond does not meet this test of hydrolytic stability, i.e., the bond is only temporary, the glass and the polymer will delaminate from one another. When the polymer and coupling agent-coated glass are a blend and delamination occurs, the blend becomes simply a filled polymer rather than a reinforced polymer.

A difference between filled polymer and reinforced polymer is shown in the drawing, which is a plot of tensile stress versus strain for tensile bars of (a) PTFE (polytetrafluoroethylene) containing no glass fibers, (b) PTFE containing 25 percent by weight of 1/64 inch milled glass fibers coated with a water-hydrolyzable, amino-functional silane, and sintered under nitrogen, and (c) the composition of b but sintered in air.

The stress-strain curve for composition b exhibits a higher yield point than the the unfilled composition a, while the stress-strain curve for composition c exhibits a lower yield point than for composition a. The higher yield point for the curve of composition b shows that the glass fibers are reinforcing the polymer, providing a reinforced blend. The lower yield point of the curve of composition c shows that the glass fibers are only filling the polymer, providing only a filled blend. The yield point for composition b is almost double that of composition c.

The only difference between compositions b and c is the atmosphere under which the compositions were sintered, illustrating the criticality of inert atmosphere sintering. PTFE reinforced with from 10 to 40 percent by weight of glass fibers according to the present invention will have a tensile strength of at least 2,000 psi. at 30 percent elongation, and preferably at least 2,300 psi. at the same elongation, measured according to ASTM D 638-67T at a head speed of 2 inches per minute. These minimum tensile strength values are met even after boiling in water at 100°C. for 24 hours. By way of comparison, PTFE containing no glass fibers has a tensile strength of about 1,500 psi. at 30 percent elongation and glass-filled PTFE has a tensile strength of about 1,300 psi. at 30 percent elongation. In addition to improved tensile strength, even after the boiling treatment described, reinforced PTFE of the present invention exhibits other improvements in physical properties such as increased compressive strength and reduced creep.

The curve for composition b of the drawing will be substantially unchanged after boiling for 24 hours at 100°C. In contrast, a blend of PTFE and clean glass fibers sintered under $N_2$, while having an initial stress strain curve resembling that of composition b, will exhibit a stress-strain curve like that of composition c after the boiling, showing the destruction of the glass-to-polymer bond.

The inert atmosphere can be provided by free sintering the polytetrafluoroethylene (in contact with the silane-coated glass) in the absence of air, such as by using a vacuum or an atmosphere of gas which is inert to the polymer and coupling agent, such as nitrogen or the rare earth gases, such as argon. Another method for excluding air is to envelop the polymer in a solid, air-impermeable structure such as a membrane or the cavity in a press, from which air has been swept. When sintering thick sections of the polymer without using an inert atmosphere, air that is present will enter the polymer to an extent depending on the preform pressure and the length of time of sintering. In that portion of the polymer which is penetrated by the air, e.g., 60 mils to 3 inches deep, the glass and polymer will be unbonded. The coupling agent-coated glass and polymer in the interior portion that is not penetrated by air will achieve a hydrolytically stable bond. The resultant sintered article consists of a skin of filled polymer surrounding an interior of reinforced polymer. The skin acts to produce the inert atmosphere for the interior, during sintering. This skin can be removed from sintering. Use of an inert atmosphere at the exterior of the polymer, however, provides uniform bonding, e.g., reinforcement, throughout.

The requirement of inert atmosphere sintering is specific to polytetrafluoroethylene and not the melt fabricable copolymers thereof, such as tetrafluoroethylene/-hexafluoropropylene copolymer. Merely contacting the coupling agent-coated glass with such copolymers in molten form, followed by cooling, produces hydrolytically stable bonding without an inert atmosphere being present in the contacting step. Another difference between PTFE and melt fabricable copolymers thereof insofar as silane coupling agents are concerned is that many more silanes will bond to the latter, which will not bond to PTFE. For example, in place of the amino function of group B described hereinbefore, group B can be epoxy, carbonyl or vinyl functional, and the resultant silane will form hydrolytically stable bonds with melt fabricable copolymers, bt not with PTFE, even when inert atmosphere sintering is used.

The glass fiber reinforced PTFE prepared according to the present invention can be used in many of the applications in which the polymer by itself is used, with better performance from the improved physical properties being obtained. Laminates of glass fabric and PTFE, or such fabric impregnated with PTFE, prepared according to the present invention can be used as non-stick belting for conveyors and the like.

Examples which are intended as illustrations of the present invention and not limitations on the scope thereof are as follows. Parts and percents are by weight unless otherwise indicated.

EXAMPLES 1 to 4

These examples show the bonding of PTFE to glass. Two sheets of 6 inch × 6 inch × ⅛ inch Pyrex glass plates were cleaned. Several ml. of a solution of organo-silane were placed between the plates and squeezed into coating the opposing surfaces of the plates. The plates were slid apart and dried at 120–130°C. for at least 10 minutes.

Tape made of paste-extruded unsintered polytetrafluoroethylene was placed between the silane coated surfaces of the glass plates, followed by sintering of the resultant structure at 380°C. for 20 minutes, and pressing at 10,000 lbs. for 8 minutes and cooling to 150°C. before pressure release.

This preparation was repeated for several different silanes and for no silane at all. The resultant laminates were cut into ½ inch × ½ inch specimens and subjected to compressive shear testing before boiling in water and after boiling in water for 7 days at 100°C. The test results and silanes employed are shown in Table I.

TABLE I

| Example | Silane used to coat glass plates | Compressive Shear Stress (psi) | |
|---|---|---|---|
| | | Before boiling | After boiling |
| 1 | none | 1161 | delaminated |
| 2 | $NH_2(CH_2)_3Si(OC_2H_5)_3$ | 2027 | 1680 |
| 3 | $NH_2(CH_2)_2HN(CH_2)_3Si(OCH_3)_3$ | 1449 | 1565 |
| 4 | $(HOCH_2CH_2)_2N(CH_2)_3Si(OC_2H_5)_3$ | 1630 | 1494 |

EXAMPLES 5 to 10

The procedure described in Examples 1 to 4 was repeated using interlayer of skived tape of polytetrafluoroethylene. Test results and the silanes used are given in Table II.

TABLE II

| Example | Silane used to coat glass plates | Compressive Shear Stress (psi) | |
|---|---|---|---|
| | | Before boiling | After boiling |
| 5 | none | 1355 | Delaminated |
| 6 | $NH_2(CH_2)_3Si(OC_2H_5)_3$ | 1485 | 1728 |
| 7 | $NH_2(CH_2)_2HN(CH_2)_3Si(OCH_3)_3$ | 1251 | 775 |
| 8 | $(HOCH_2CH_2)_2N(CH_2)_3Si(OC_2H_5)_3$ | 1650 | 1182 |
| 9 | $p-NH_2C_6H_4(CH_2)_3Si(OCH_3)_3$ | 625 | 452 |
| 10 | $NH_2CH_2CH_2NHCH_2CH(CH_3)CH_2SiCH_3[OCH]_2$ | 2221 | 1223 |

EXAMPLE 11

This example illustrates the use of methacrylato chromic chloride coupling agent. A 1 percent solution of the chrome complex in distilled water was prepared and its pH was adjusted to about 4.8 using 1 percent aqueous ammonium hydroxide. A 300 g. sample of 1/32 inch milled glass fiber was placed in 500 ml. of the above solution for about 1 hour and was then filtered and dried at 250°F. for 1 hour. A 125 g. portion of this treated glass was blended with polytetrafluoroethylene granular resin (particle size ca. 20 microns) using a Reitz mill. Tensile plaques were preformed from the blend and were sintered in either air or nitrogen.

When sintered in air, the plaques had a yield stress of 1,697 psi. at an elongation of 11 percent, indicating the glass fibers were only filling and not reinforcing the polymer.

When sintered in nitrogen, the plaques had a yield stress of 2,676 psi. at 28 percent elongation. After boiling in water at 100°C. for 24 hours, these plaques had a yield stress of 2,453 psi. at 32 percent elongation.

This experiment was repeated using nitrogen sintering except that pH adjustment of the aqueous solution of chrome complex was omitted. The sintered tensile plaques had a yield stress of 2,831 psi. at 60 percent elongation and after boiling in water at 100°C. for 24 hours a yield stress of 2,487 psi. at 34 percent elongation. After boiling treatment for 3 days, the plaques had a yield stress of 2,359 psi. at 23 percent elongation.

EXAMPLE 12

A mixture of 375 g. of polytetrafluoroethylene granular resin (particle size ca. 20 microns) and 125 g. of ½ inch chopped glass fiber, which had been previously treated with an aqueous 3 percent solution of $NH_2CH_2CH_2NH(CH_2)_3Si(OCH_3)_3$ and dried, was passed twice through a Reitz mill operating at 5,000 rpm. The mill was fitted with an 0.047 inch scuff screen.

Tensile plaques were prepared from the above blend according to ASTM Procedure D-1457-56-T, and were sintered in an air or nitrogen atmosphere at 380°C. Tensile measurements were made on microtensile bars cut from the sintered plaques using an Instron tensile testing machine. The following tensile data was obtained:

| Sintering Atmosphere | Yield Stress (psi) | Yield Elongation Percent |
|---|---|---|
| Air | 1230 | 2.9 |
| $N_2$ | 3134 | 9.5 |

Samples of the above blend which were sintered in nitrogen were boiled in water for 14 days had the following tensile behavior: yield stress = 3,367 (psi.), yield elongation = 7.5 percent.

EXAMPLE 13

The procedure described in Example 12 was repeated using the same polymer and glass fiber which had been treated with $(HOCH_2CH_2)_2N(CH_2)_3Si(OC_2H_5)_3$. The composition had the following tensile properties:

| Sintering Atmosphere | Yield Stress (psi) | Yield Elongation Percent |
|---|---|---|
| Air | 1376 | 3.6 |
| $N_2$ | 2889 | 8.4 |

Samples of the above blend which were sintered in nitrogen were boiled in water for 14 days and had the following tensile behavior: yield stress = 3,094 (psi.), yield elongation = 7.3 percent.

EXAMPLE 14

The procedure described in Example 12 was repeated using 100 g. of untreated ½ inch chopped glass fiber (no silane coating) and 400 g. of polytetrafluoroethylene granular resin. The composition had the following tensile properties:

| Sintering Atmosphere | Yield Stress (psi) | Yield Elongation Percent |
|---|---|---|
| Air | 1455 | 3.1 |
| $N_2$ | 2827 | 5.3 |

A tensile plaque of the composition which was sintered in nitrogen was boiled in water for 2 days and had the following tensile properties: yield stress = 1,607 psi., yield elongation = 1.5 percent.

These data show that merely the use of an inert atmosphere produces marked adhesion between the glass fibers and the resin, but this adhesion does not survive in boiling water. After boiling the nitrogen-sintered sample had tensile properties similar to an air-sintered, filled (unreinforced) composition.

EXAMPLES 15 to 20

The procedure described in Example 12 was repeated using blends consisting of 20 percent by weight glass fiber and 80 percent by weight polytetrafluoroethylene granular resin. The glass fiber was treated with the coupling agents indicated in Table III along with the tensile yield stress of the sintered blends.

EXAMPLES 21 to 28

The procedure described in Example 12 was repeated using the same polymer and ¼ inch chopped fiberglass which was treated with 3 percent aqueous solutions of the organo-silanes listed in Table IV. The tensile properties of the reinforced compositions are also given in Table IV.

EXAMPLES 29 to 32

The procedure described in Example 12 was repeated using the same polymer except that 1/64 inch milled glass fibers which had been treated with 3 percent solutions of the amino-silanes given in Table V was used as the reinforcing member. The tensile properties of the compositions, sintered in nitrogen, are also given in Table V. These results show that definite adhesion was produced even when "short" glass fibers were used.

EXAMPLES 33 to 48

The procedure described in Example 12 was repeated except that ¼ inch, ⅛ inch, 1/16 inch and 1/32 inch milled glass fibers which had been treated with 3 percent solutions of either $$NH_2CH_2CH_2NH(CH_2)_3Si(OCH_3)_3 \text{ or}$$

$$(HOCH_2CH_2)_2N(CH_2)_3Si(C_2H_5)_3$$

were blended into separate samples of the polytetrafluoroethylene granular resin. The tensile properties of

TABLE III

| Example | Silane used to coat glass fibers | Sintering Atmosphere | Yield Stress (psi) | Yield Elongation (%) | Days in boiling water |
|---|---|---|---|---|---|
| 15 | m-$NH_2C_6H_4Si(OC_2H_5)_3$ | Air | 1640 | 4.3 | 0 |
| 16 | m-$NH_2C_6H_4Si(OC_2H_5)_3$ | $N_2$ | 2893 | 8.0 | 0 |
| 17 | m-$NH_2C_6H_4Si(OC_2H_5)_3$ | $N_2$ | 2703 | 6.5 | 14 |
| 18 | p-$NH_2C_6H_4(CH_2)_3Si(OCH_3)_3$ | Air | 1931 | 3.4 | 0 |
| 19 | p-$NH_2C_6H_4(CH_2)_3Si(OCH_3)_3$ | $N_2$ | 2906 | 8.9 | 0 |
| 20 | p-$NH_2C_6H_4(CH_2)_3Si(OCH_3)_3$ | $N_2$ | 2510 | 4.2 | 14 |

TABLE IV

| 21 | $NH_2(CH_2)_3Si(OC_2H_5)_3$ | $N_2$ | 2376 | 4.2 | 0 |
|---|---|---|---|---|---|
| 22 | $NH_2(CH_2)_3Si(OC_2H_5)_3$ | " | 2340 | 4.6 | 7 |
| 23 | $NH_2(CH_2)_2NH(CH_2)_3Si(OCH_3)_3$ | " | 3168 | 8.8 | 0 |
| 24 | $NH_2(CH_2)_2NH(CH_2)_3Si(OCH_3)_3$ | " | 3115 | 8.7 | 7 |
| 25 | p-$NH_2C_6H_4(CH_2)_3Si(OCH_3)_3$ | " | 2776 | 5.7 | 0 |
| 26 | p-$NH_2C_6H_4(CH_2)_3Si(OCH_3)_3$ | " | 2426 | 5.3 | 7 |
| 27 | $(HOCH_2CH_2)_2N(CH_2)_3Si(OC_2H_5)_3$ | " | 2940 | 6.9 | 0 |
| 28 | $(HOCH_2CH_2)_2N(CH_2)_3Si(OC_2H_5)_3$ | " | 2883 | 7.0 | 7 |

TABLE V

| Example | Silane used to coat glass fibers | Yield Stress (psi) | Yield Elongation % | Days boiled in water |
|---|---|---|---|---|
| 29 | $(HOCH_2CH_2)_2N(CH_2)_3Si(OC_2H_5)_3$ | 2564[1] | 31 | 0 |
| 30 | $(HOCH_2CH_2)_2N(CH_2)_3Si(OC_2H_5)_3$ | 2409 | 27 | 7 |
| 31 | $NH_2CH_2CH_2NH(CH_2)_3Si(OCH_3)_3$ | 2423[1] | 22 | 0 |
| 32 | $NH_2CH_2CH_2NH(CH_2)_3Si(OCH_3)_3$ | 2314 | 20 | 7 |

[1]Identical samples which were sintered in air had yield the compositions, sintered under nitrogen, are given in Table VI. Data is also given for identically prepared specimens which were boiled 3 days in water.

Yield stress, as used herein, is the intersection between the tangent to the initial slope of the stress-strain curve and the tangent to the final slope (short of any zero slope) of the curve.

As many apparently widely different embodiments of this invention may be made without departing from the spirit and scope thereof, it is to be understood that this invention is not limited to the specific embodiments thereof except as defined in the appended claims.

What is claimed is:

1. A process comprising coating glass with a water-hydrolyzable amino-functional silane or methacrylato chromic chloride, bringing the coated glass and polytetrafluoroethylene into contact with one another, sintering the polytetrafluoroethylene in the resultant composite structure in an inert atmosphere, and obtaining as a result thereof a hydrolytically stable bond between the glass and the polytetrafluoroethylene.

2. The process of claim 1 wherein said glass is in the form of glass fibers and the bringing into contact step is carried out by blending the coated fibers with the polytetrafluoroethylene in particulate form.

3. The process of claim 1 wherein the sintering is done at a temperature of from 350 to 390°C.

4. A hydrolytically stable composite structure blend comprising polytetrafluoroethylene bonded to glass fiber through a monomeric water-hydrolyzable amino-functional silane or methacrylato chromic chloride coupling agent, said glass fiber providing reinforcement of said polytetrafluoroethylene, said glass fiber comprising from 10 to 40 percent by weight of said blend, said blend having a tensile strength of at least 2,000 psi. at 30 percent elongation.

5. The blend of claim 4 wherein the coupling agent is omega-aminoalkyltrialkoxy silane wherein the alkyl group contains from three to nine carbon atoms and the alkoxy groups contain from one to five carbon atoms each.

6. The blend of claim 4 wherein the amino function of said coupling agent is provided by the group

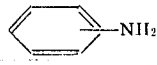

bonded directly or indirectly to the Si atom of the coupling agent.

7. The blend of claim 4 wherein said coupling agent is monomeric water-hydrolyzable amino-functional silane.

8. The blend of claim 4 wherein said coupling agent is methacrylato chromic chloride.

9. A reinforceable composition of polytetrafluoroethylene and glass in which the glass is capable of providing hydrolytically stable reinforcement of said polytetrafluoroethylene, said composition consisting essentially of said polytetrafluoroethylene blended with from 5 to 50 percent by weight of said glass in the particulate form, said glass having a coating of monomeric water-hydrolyzable amino-functional silane or methacrylato chromic chloride coupling agent.

10. The composition of claim 9 wherein the glass is glass fibers and the coupling agent is monomeric water-hydrolyzable amino-functional silane.

11. The composition of claim 9 wherein the glass is glass fibers and the coupling agent is methacrylato chromic chloride.

12. A hydrolytically stable blend comprising polytetrafluoroethylene bonded to glass fiber through a monomeric water-hydrolyzable amino-functional silane, said glass fiber comprising from 10 to 40 percent by weight of said blend.

13. A product comprising a durable silicate glass and a polytetrafluoroethylene resin bonded to the surface of the glass by means of an intermediate amino-functional silane coupling agent, the amino group being a primary or secondary amine.

14. The product of claim 13 wherein said polytetrafluoroethylene resin is tetrafluoroethylene polymer.

15. The product of claim 13 wherein said glass is borosilicate glass.

16. The product of claim 15 wherein said amino-functional coupling agent is N-beta-aminoethyl-gamma-aminopropyl-trimethoxysilane.

17. The product of claim 15 wherein said amino-functional coupling agent is N-beta-aminoethyl-(alpha-methyl-gamma-aminopropyl)-dimethoxymethylsilane.

18. The product of claim 15 wherein said amino functional coupling agent is gamma-aminopropyl-triethoxysilane.

TABLE VI

| Example | Silane used to coat glass fibers | Milled[1] Fibers (inch) | Yield Stress (psi) | Yield Elongation (%) | Days in boiling water |
|---|---|---|---|---|---|
| 33 | $NH_2CH_2CH_2NH(CH_2)_3Si(OCH_3)$ | ¼ | 2779 | 13 | 0 |
| 34 | $NH_2CH_2CH_2NH(CH_2)_3Si(OCH_3)$ | ¼ | 2850 | 13 | 3 |
| 35 | $NH_2CH_2CH_2NH(CH_2)_3Si(OCH_3)$ | ⅛ | 2604 | 12 | 0 |
| 36 | $NH_2CH_2CH_2NH(CH_2)_3Si(OCH_3)$ | ⅛ | 2707 | 12 | 3 |
| 37 | $NH_2CH_2CH_2NH(CH_2)_3Si(OCH_3)$ | 1/16 | 2962 | 14 | 0 |
| 38 | $NH_2CH_2CH_2NH(CH_2)_3Si(OCH_3)$ | 1/16 | 2981 | 14 | 3 |
| 39 | $NH_2CH_2CH_2NH(CH_2)_3Si(OCH_3)$ | 1/32 | 2197 | 3 | 0 |
| 40 | $NH_2CH_2CH_2NH(CH_2)_3Si(OCH_3)$ | 1/32 | 2372 | 3 | 3 |
| 41 | $(HOCH_2CH_2)_2N(CH_2)_3Si(OC_2H_5)_3$ | ¼ | 2841 | 13 | 0 |
| 42 | $(HOCH_2CH_2)_2N(CH_2)_3Si(OC_2H_5)_3$ | ¼ | 2814 | 10 | 3 |
| 43 | $(HOCH_2CH_2)_2N(CH_2)_3Si(OC_2H_5)_3$ | ⅛ | 2230 | 10 | 0 |
| 44 | $(HOCH_2CH_2)_2N(CH_2)_3Si(OC_2H_5)_3$ | ⅛ | 2619 | 11 | 3 |
| 45 | $(HOCH_2CH_2)_2N(CH_2)_3Si(OC_2H_5)_3$ | 1/16 | 2606 | 15 | 0 |
| 46 | $(HOCH_2CH_2)_2N(CH_2)_3Si(OC_2H_5)_3$ | 1/16 | 2673 | 13 | 3 |
| 47 | $(HOCH_2CH_2)_2N(CH_2)_3Si(OC_2H_5)_3$ | 1/32 | 2203 | 3 | 0 |
| 48 | $(HOCH_2CH_2)_2N(CH_2)_3Si(OC_2H_5)_3$ | 1/32 | 2351 | 3 | 3 |

[1]Fibers before passing through Reitz Mill